(12) United States Patent
Cern

(10) Patent No.: US 7,529,073 B2
(45) Date of Patent: May 5, 2009

(54) PROTECTING MEDIUM VOLTAGE INDUCTIVE COUPLED DEVICE FROM ELECTRICAL TRANSIENTS

(75) Inventor: Yehuda Cern, Brookline, MA (US)

(73) Assignee: Ambient Corporation, Newton, MA (US)

( * ) Notice: Subject to any disclaimer, the term of this patent is extended or adjusted under 35 U.S.C. 154(b) by 177 days.

(21) Appl. No.: 11/500,259

(22) Filed: Aug. 7, 2006

(65) Prior Publication Data

US 2006/0268487 A1 Nov. 30, 2006

Related U.S. Application Data

(62) Division of application No. 10/388,115, filed on Mar. 13, 2003, now Pat. No. 7,116,007.

(60) Provisional application No. 60/364,321, filed on Mar. 14, 2002, provisional application No. 60/376,377, filed on Apr. 29, 2002.

(51) Int. Cl.
*H02H 1/04* (2006.01)
*H02H 3/22* (2006.01)

(52) U.S. Cl. .................. 361/118; 361/119; 361/120; 340/310.17

(58) Field of Classification Search ................. 361/118, 361/119, 120; 340/310.7
See application file for complete search history.

(56) References Cited

U.S. PATENT DOCUMENTS

| | | | |
|---|---|---|---|
| 1,868,483 A | 7/1932 | Austin | |
| 1,889,552 A | 11/1932 | Keinath et al. | |
| 3,056,037 A * | 9/1962 | Diebold | 307/58 |
| 3,156,866 A | 11/1964 | Anderson et al. | |
| 3,257,501 A | 6/1966 | Sauer | |
| 3,331,023 A | 7/1967 | Adkins et al. | |
| 3,459,881 A | 8/1969 | Painter et al. | |

(Continued)

FOREIGN PATENT DOCUMENTS

JP 53-136909 11/1978

(Continued)

OTHER PUBLICATIONS

Flanagan, Handbook of Transformer Design & Applications, 1992, McGraw-Hill, Inc., 2nd Edition, pp. 10.9-10.20.*

(Continued)

*Primary Examiner*—Stephen W Jackson
*Assistant Examiner*—Zeev Kitov
(74) *Attorney, Agent, or Firm*—Ohlandt, Greeley, Ruggiero & Perle, LLP

(57) ABSTRACT

There is provided a method for protecting loads associated with power distribution system inductive signal couplers. The method includes (a) providing an inductive signal coupler having a first winding in series with a line conductor of a power distribution system, and a second winding having first and second connection terminals, (b) connecting a first terminal of a first fuse to the first connection terminal, and a first terminal of a second fuse to the second connection terminal, a second terminal of each fuse being connected to a communication device, and (c) connecting a first terminal of a first choke to the second terminal of the first fuse, and a first terminal of a second choke to the second of the second fuse, a second terminal of each choke being connected to an electrical ground.

27 Claims, 9 Drawing Sheets

U.S. PATENT DOCUMENTS

| | | | |
|---|---|---|---|
| 3,723,818 A | 3/1973 | Zocholl | |
| 3,942,170 A | 3/1976 | Whyte | |
| 3,961,287 A | 6/1976 | Cacciola et al. | |
| 4,016,429 A | 4/1977 | Vercellotti et al. | |
| 4,142,178 A | 2/1979 | Whyte et al. | |
| 4,199,743 A | 4/1980 | Martincic | |
| 4,319,224 A | 3/1982 | Tappeiner et al. | |
| 4,347,540 A * | 8/1982 | Gary et al. | 361/47 |
| 4,395,590 A * | 7/1983 | Pierce et al. | 379/93.36 |
| 4,408,186 A | 10/1983 | Howell | |
| 4,413,230 A | 11/1983 | Miller | |
| 4,443,662 A * | 4/1984 | Nakhla | 379/30 |
| 4,558,271 A | 12/1985 | Poole | |
| 4,775,849 A | 10/1988 | Lucas | |
| 4,823,096 A * | 4/1989 | Hash | 333/109 |
| 5,053,910 A * | 10/1991 | Goldstein | 361/111 |
| 5,081,440 A | 1/1992 | Ott et al. | |
| 5,210,519 A * | 5/1993 | Moore | 375/258 |
| 5,252,913 A | 10/1993 | Falkowski et al. | |
| 5,698,831 A | 12/1997 | Abdelgawad et al. | |
| 5,751,536 A | 5/1998 | Haddad et al. | |
| 5,952,914 A | 9/1999 | Wynn | |
| 6,140,573 A | 10/2000 | Smith et al. | |
| 6,452,482 B1 | 9/2002 | Cern | |
| 6,590,494 B2 | 7/2003 | Gohr | |
| 6,678,139 B1 | 1/2004 | Greuter et al. | |
| 6,760,206 B2 | 7/2004 | Daharsh et al. | |
| 6,785,110 B2 * | 8/2004 | Bartel et al. | 361/119 |
| 6,809,633 B2 | 10/2004 | Cern | |
| 6,965,302 B2 * | 11/2005 | Mollenkopf et al. | 370/475 |
| 2004/0032320 A1 | 2/2004 | Zalitzky et al. | |

FOREIGN PATENT DOCUMENTS

| | | |
|---|---|---|
| JP | 55-15092 | 2/1980 |
| JP | 56-007531 | 1/1981 |
| JP | 57-181237 | 11/1982 |
| JP | 63-290023 | 11/1988 |
| JP | 04-242910 | 8/1992 |

OTHER PUBLICATIONS

Office Action dated Jan. 9, 2007 from Japanese Patent Application No. 2003-577378.

* cited by examiner

US 7,529,073 B2

PROTECTING MEDIUM VOLTAGE INDUCTIVE COUPLED DEVICE FROM ELECTRICAL TRANSIENTS

CROSS REFERENCE TO RELATED APPLICATIONS

The present application is a divisional of U.S. patent application Ser. No. 10/388,115, filed Mar. 13, 2003, now U.S. Pat. No. 7,116,007 which claims priority of U.S. Provisional Patent Application Ser. No. 60/364,321, filed on Mar. 14, 2002, and U.S. Provisional Patent Application Ser. No. 60/376,377, filed on Apr. 29, 2002.

BACKGROUND OF THE INVENTION

1. Field of the Invention

The present invention relates to coupling communication signals to electrical power distribution systems.

2. Background of the Related Art

Radio frequency (rf) modulated data signals can be coupled to and communicated over medium and low voltage power distribution networks. Use of inductive couplers for this purpose is described in U.S. Pat. No. 6,452,482, entitled "Inductive Coupling of a Data Signal to a Power Transmission Cable", and U.S. patent application Ser. No. 10/082,063, filed Feb. 25, 2002, entitled, "Coupling Broadband Lines", both of which are assigned to the assignee of the present application, and the contents of which are incorporated herein by reference.

Power distribution networks are occasionally subject to significant transients in voltage and current. For example, a strong current pulse of fast rise time is created when a power line device such as a distribution transformer short circuits, or when power lines fall and touch each other. Similarly, a lightning strike to a nearby point on the power line generates a traveling wave on the power line. A standard method of simulating a lightning strike is the Basic Impulse Loading (BIL) pulse, used for testing power line devices that would be connected to power lines, and it has a rise time of 1.2 microseconds, with a much longer fall time. The amplitude of such test pulses can vary between 90 and 200 kV peak.

A power line inductive coupler is basically a transformer whose primary is connected to the power line and whose secondary is connected to a communications apparatus such as a modem. The primary winding has one or just a few turns and presents a very low impedance at a power frequency. However, the coupler is capable of coupling the high frequency energy represented by the fast onset of a lightning pulse or other transient, and substantial voltage would be induced in the coupler secondary circuit.

Coupler flashover of medium voltage from a primary power wire to ground occurs when the wire's voltage exceeds the insulation capability of the coupler, whether during normal operation or during transient voltage pulses originating in lightning strikes or switching transients. Flashover can occur on the outer surface of the coupler or internally between parts of the coupler. Flashover may be considered a very rare event for suitably insulated devices attached to a medium voltage power line. For example, current and potential transformers commonly used by utilities often do not carry special protective circuitry. But in the case of a data coupler, which is intended to be used ubiquitously for a large customer base, it is considered prudent to protect against rare events, to prevent injury or damage.

In addition, since the modem is connected to lines leading to customer equipment, the modem is grounded. Therefore, the distribution power voltage must be insulated from the modem. If the inductive coupler's secondary were insulated from ground, then the voltage difference between the power line and ground would be divided across (a) the coupler's primary to secondary insulation and (b) the insulation of other devices in the chain of devices leading to the modem. The voltage drops would be proportional to the impedances across each insulation interface, and thus inversely proportional to the stray capacitance across each such interface.

When dealing with medium voltage ac power lines, with voltages in excess of 2,000 volts rms relative to neutral or ground, this capacitive voltage division would be difficult to make deterministic, as the coupler capacitance would depend on the position and diameter of the power line within the coupler. Therefore, any other insulating devices would need to be capable of insulating the full power line voltage, and thus be large and expensive.

SUMMARY OF THE INVENTION

Embodiments of the present invention are directed to techniques for protecting an inductive coupler of data signals to a power distribution network from electrical transients such as transient over-voltage and over-current conditions. More specifically, embodiments of the present invention enable an inductive coupler to withstand voltage spikes and provides protection against surges from flashover, i.e., the sudden breakdown of electrical insulation in the coupler, with optimal coupling of the rf data signal between an rf data modem and the power line. Embodiments also protect against transient current pulses that may develop on the power distribution line from such causes as a lightning strike or short-circuiting of the line to electrical ground.

A method for protecting loads associated with power distribution system inductive signal couplers includes (a) providing an inductive signal coupler having a first winding in series with a line conductor of a power distribution system, and a second winding having first and second connection terminals, (b) connecting a first terminal of a first fuse to the first connection terminal, and a first terminal of a second fuse to the second connection terminal, a second terminal of each fuse being connected to a communication device, and (c) connecting a first terminal of a first choke to the second terminal of the first fuse, and a first terminal of a second choke to the second of the second fuse, a second terminal of each choke being connected to an electrical ground.

Another method for protecting loads associated with power distribution system inductive signal couplers includes (a) providing an inductive signal coupler having a first winding in series with a line conductor of a power distribution system, and a second winding having first and second connection terminals, and (b) connecting each terminal of the second winding to an electrical ground via a choke, the choke presenting a high impedance to signal frequencies and a low impedance to current from an electrical fault signal.

An arrangement of components includes (a) an inductive signal coupler having a first winding in series with a line conductor of a power distribution system, and a second winding having a first connection terminal and a second connection terminal, (b) a first fuse having a first terminal connected to the first connection terminal, and a second terminal for coupling a signal to a first terminal of a communication device, (c) a second fuse having a first terminal connected to the second connection terminal, and a second terminal for coupling a signal to a second terminal of the communication device, (d) a first choke having a first terminal connected to the second terminal of the first fuse, and a second terminal connected to an electrical ground, and (e) a second choke having a first terminal connected to the second terminal of the second fuse, and a second terminal connected to the electrical ground.

Another arrangement of components includes (a) an inductive signal coupler having a first winding in series with a line conductor of a power distribution system, and a second winding having a first connection terminal and a second connection terminal, (b) a first choke between the first connection terminal and an electrical ground, and (c) a second choke between the second connection terminal and the electrical ground. Each of the first choke and the second choke present a high impedance to a signal frequency and a low impedance to current from an electrical fault signal.

An inductive signal coupler for coupling a signal to a power distribution system includes a first winding in series with a line conductor of the power distribution system, and sheds for providing a leakage path to avoid external flashover during an electrical transient.

Another inductive signal coupler for coupling a signal to a power distribution system includes a winding in series with a line conductor of the power distribution system, and a conductive plate at an end of the coupler distal from the first winding, for routing a flashover current to an electrical ground.

BRIEF DESCRIPTION OF THE DRAWINGS

The present invention will be more readily understood by reference to the following detailed description taken with the accompanying drawings, in which.

DESCRIPTION OF THE INVENTION

One embodiment of the present invention grounds the secondary winding of an inductive coupler by appropriate rf devices. This protects against over-voltage transients and takes full advantage of the principle of magnetic coupling, which is not affected by the thickness of the winding insulation. Consequently, the medium voltage of the power line is insulated from the modem solely by the insulation of the secondary winding. This approach prevents flashover current from propagating to low voltage lines and loads, and so prevents damage to the modem and other equipment to which the coupler may be connected.

Figure 1:
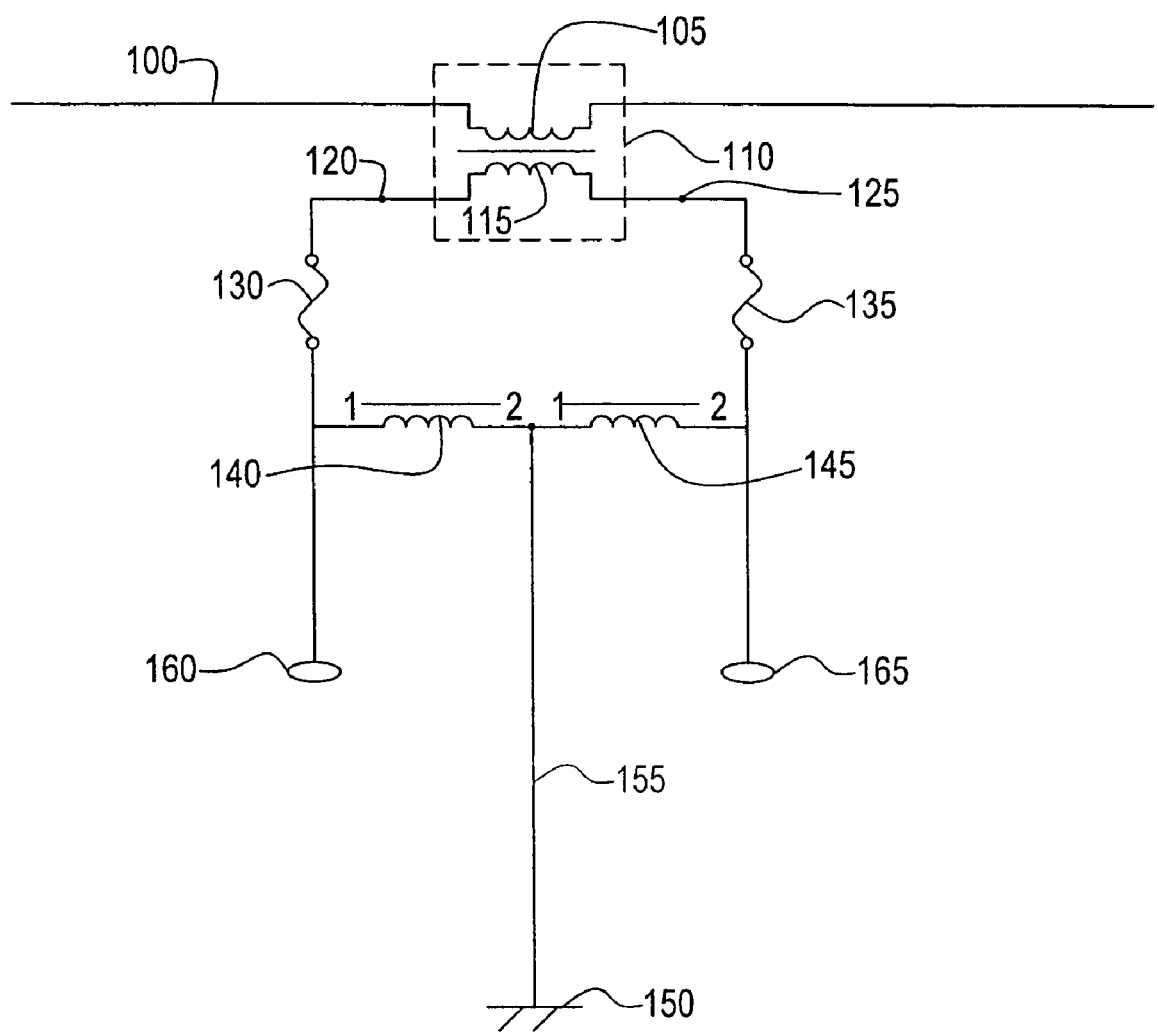
FIG. 1 shows an inductive coupler circuit according to one embodiment of the present invention, which is protected against over-voltage transients.

FIG. 1 shows an inductive coupler circuit according to one embodiment of the present invention, which is protected against over-voltage transients. Power distribution line 100 forms a primary winding 105 of inductive coupler 110, which in turn is connected to an rf data signal modem (not shown) via output terminals 160 and 165. Secondary winding 115 has terminals 120 and 125, which connect to the upper terminals of transient protection fuses 130 and 135 respectively. Rf chokes 140 and 145 connect the lower terminals of the fuses to ground 150, typically via a wire 155 connected to the "pole ground," a ground wire running from a ground rod at the base of the electric pole, up to the top of the pole. This pole ground 150 will generally be readily available in typical applications of a power line inductance coupler 110 used to bypass a distribution transformer on electric power poles.

The coupler 110 physically bridges a space between the power line 100 and the ground 150 connected to the coupler secondary winding 115. Thus, a leakage path is needed that is long enough to preclude external flashover. A typical embodiment provides "sheds." In case external flashover occurs anyway, the coupler 110 may include an exposed metal base connected to the ground 150 to which an external flashover arc may jump without harm.

The rf chokes 140 and 145 are provided to ground any potential internal flashover current within the coupler 110. The secondary winding 115 is typically embedded in insulating material body of the coupler 110, which should be thick enough to provide a sufficient insulation rating for both steady state ("withstand") voltage and for fast high voltage BIL pulses. The rf chokes 140 and 145 provide an rf impedance substantially greater than the rf impedance of the coupler secondary winding 115, while providing a low impedance to ground 150 after a few microseconds of a fault pulse. The connection of chokes 140 and 145 in shunt with the signal voltage provides a high pass filtering effect, as low frequencies are effectively shorted to ground 150. For modem frequencies above 1 MHz, chokes 140 and 145 might typically have an inductance of 10 uH each, providing a reactance across the coupler secondary winding 115 in excess of 124 ohms and rising with frequency. The chokes 140 and 145 should have a self-resonant frequency above the highest frequency of interest.

Flashover current is limited only by the capacity of the power line 100, typically up to 10,000 amps rms or about 14,000 amps peak. This flashover current is interrupted by and divided roughly equally between the fuses 130 and 135. Until the fuses 130 and 135 blow open, the rf chokes 140 and 145 need to carry the short circuit current without failing. Thus, rf chokes 140 and 145 should be wound with wire capable of withstanding the flashover current pulse that might flow.

The speed and size of a possible flashover current pulse suggests use of suitably rated expulsion fuses or current limiting fuses for the transient protection fuses 130 and 135. An expulsion fuse can interrupt current up to 8 milliseconds after the onset of a flashover transient. A current limiting fuse may interrupt faster, estimated not to exceed 4 milliseconds after the onset of a flashover transient. To maintain compliance with electromagnetic radiation standards, data signal current is expected to be much less than one ampere, so a 1 amp current rating for the fuses 130 and 135 would be suitable for minimizing the duration of any flashover current after an internal insulation failure.

Both current limiting and expulsion fuses have considerable length and breadth, as needed to extinguish the high energy arc initiated and maintained by the kilo-ampere short circuit current of power distribution lines. Placement of two such individually packaged fuses 130 and 135 next to each other creates a substantial enclosed area in the plane of the fuse pair, producing a substantial inductance in series with the high frequency signal. It may be noticed that during normal operation, only the small signal voltage is applied between the fuses 130 and 135, and that during an internal flashover, they would both be clearing essentially the same fault. Therefore it may be advantageous to combine the two fuses 130 and 135 into a single housing, and share the arc extinguishing mechanism. By placing the two fuses 130 and 135 in parallel with each other with a spacing and thickness commensurate with the characteristic impedance seen from the coupler secondary winding 115, the effect of spurious inductance and capacitance would be minimized, to the extent that the coupler secondary impedance was constant over frequency and known.

In the case of a current limiting fuse where wires would be wound in a double helix on a "spider" coil form, in preparation for filling the volume with sand, there is a further technique to reduce the spurious effects of fuse reactances. A magnetic core stick may be inserted inside the helix, transforming it into a common mode choke. Such a choke has minimal differential mode attenuation, even when the coupling coefficient between the windings is much less than unity.

One inherent mechanism that limits the transfer of fault energy is the saturation of the coupler cores. Once a fault current causes core saturation, magnetomotive force and induced secondary voltage are basically clamped. Power line fault transients and surges possess a waveform containing energies over a broad spectrum of frequencies. Only frequencies relevant to the modem communications should reach the modem. To that end, series capacitors can be used as high pass filters that limit the transient energy reaching the modem.

Another side-effect of attaching an inductive coupler to a power line is the flow of circulation current. The inductive coupler may be viewed as a current transformer (CT), and in the choke circuits described below, the CT secondary is short circuited by the series combination of the two chokes.

Figure 2A:
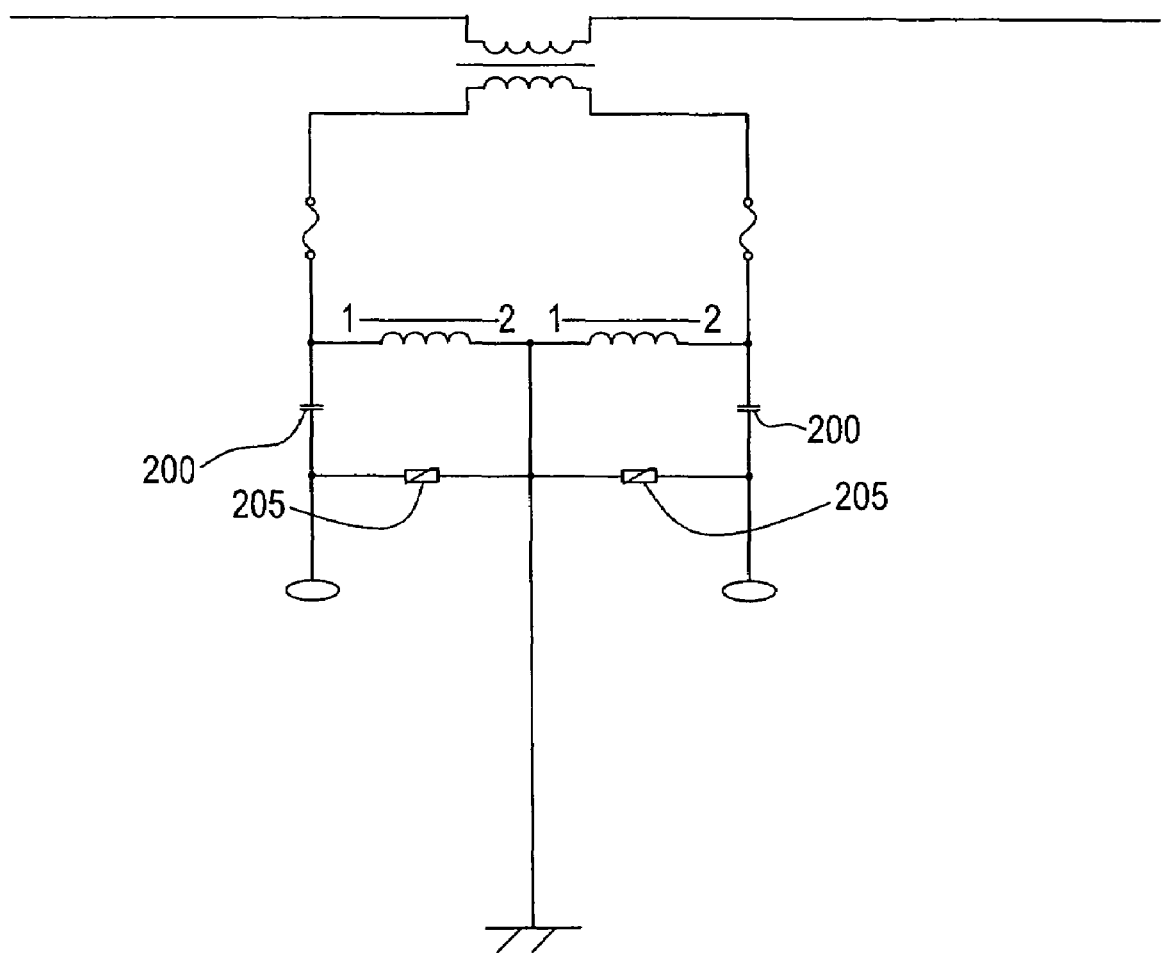
FIGS. 2A, 2B and 2C show embodiments of the present invention in which an arrangement of capacitors and surge suppressors protect against electrical transients.

Flashover can be treated as an instantaneous short-circuiting of the secondary circuit to the primary circuit, and since the choke inductors 140 and 145 initially act as an open circuit, the entire primary voltage would appear across each choke 140 and 145, for an initial few tens of nanoseconds. This can be addressed as shown in FIG. 2A by adding high frequency coupling capacitors 200 and surge suppressors 205, which lower the initial instantaneous voltage impressed on both the chokes 140 and 145 and capacitors 200, by acting as a temporary short circuit for the critical first tens of nanoseconds. This allow use of chokes 140 and 145 and capacitors 200 whose voltage rating is 10 to 100 times less than the peak primary voltage.

Figure 2B:
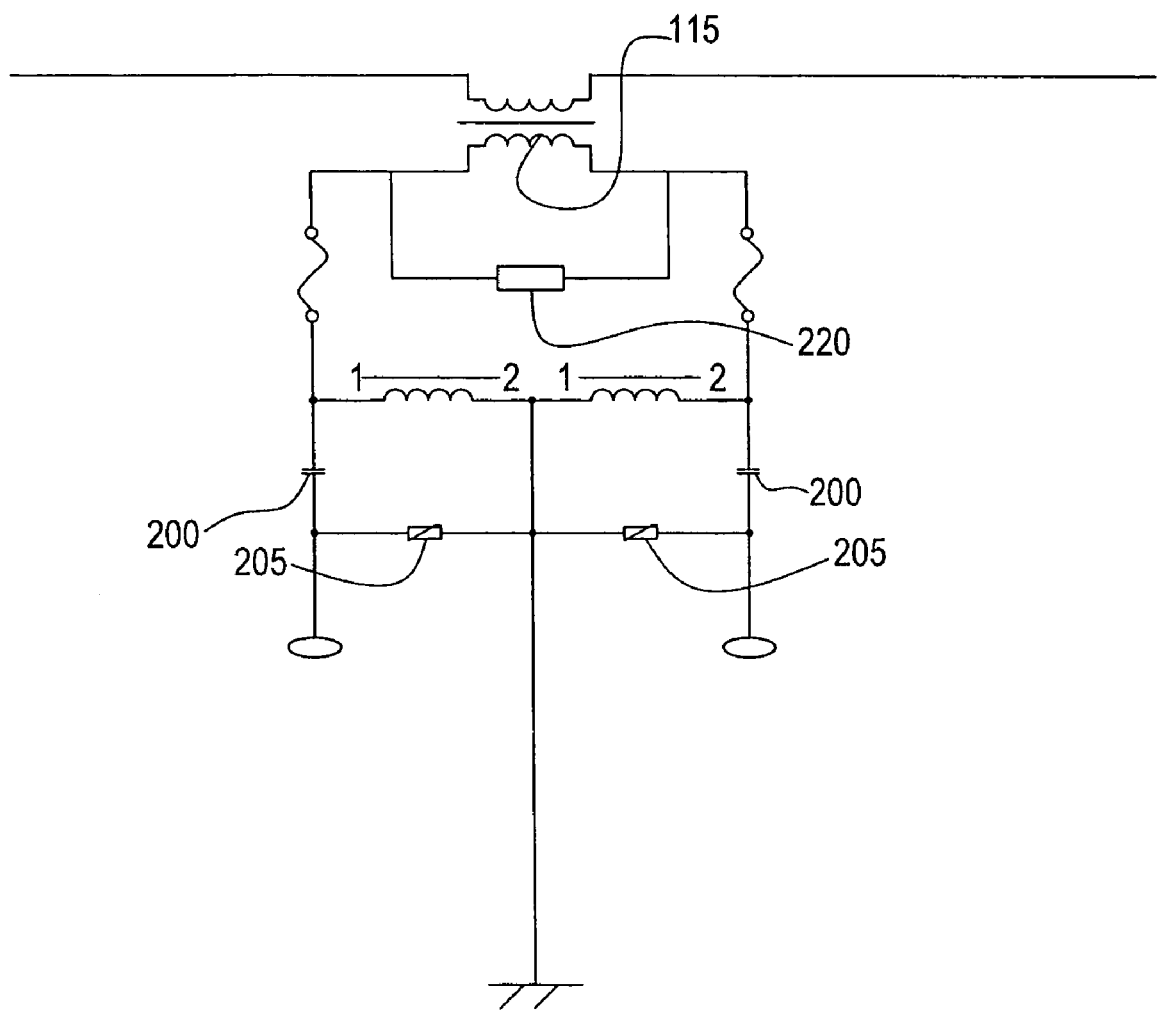

In an alternative embodiment shown in FIG. 2B, a spark gap or gas tube arrestor 220 is connected across secondary winding 115, to absorb at least part of the energy coupled to the secondary by a fast risetime surge current. The addition of this device in any of the embodiments shown in FIGS. 1 and 2 would reduce the surge energy that subsequent surge protectors need to safely absorb.

Figure 2C:
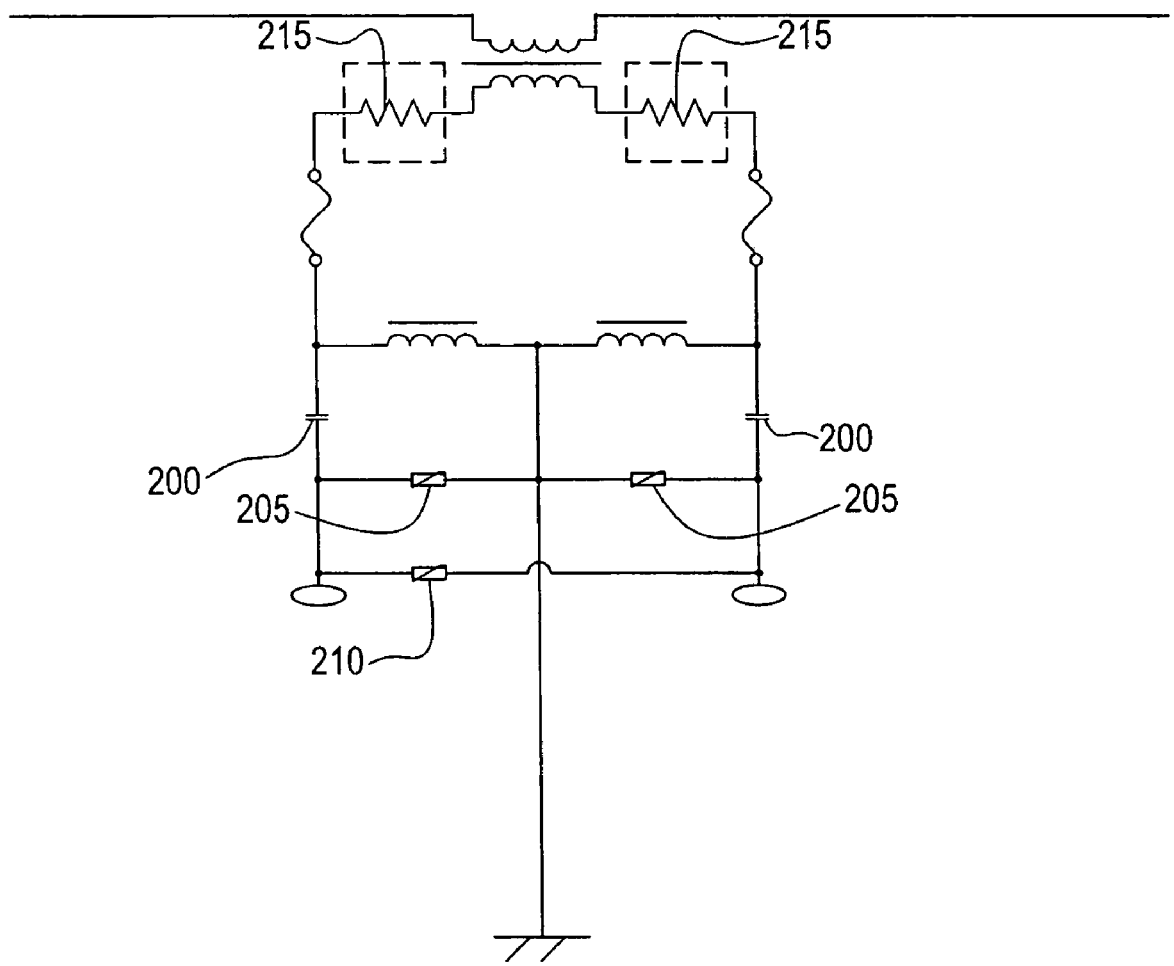

In an alternative embodiment shown in FIG. 2C, an additional surge suppressor 210 may be placed in parallel with the surge suppressors 205. The surge suppressors 205 and 210 act as a low impedance when a current fault generates voltages exceeding their clamping voltage. If the devices are identical, suppressor 210 would act as the primary voltage limiter for the differential mode, while the series pair of suppressors 205 would act as a backup limiter in case the primary suppressor 210 failed in the open circuit condition.

The high pass filtering of the shunt chokes and series capacitors limits the duration of fault pulses, and allows the use of relatively low power surge suppressors. Only such low power devices are available with the low terminal capacitance necessary to avoid high frequency loading of the signal by the surge suppressors. The very small power-frequency impedance of a high frequency coupler reduces the electromotive force (emf) generated in the inductor secondary 115, and the existence of sufficient fuse resistance, or optionally the addition of a small value resistor 215 in series with each secondary lead (typically, one half to one ohm), typically can reduce the resultant current flow to less than one ampere per thousand amperes flowing on the power line 100.

Figure 3:
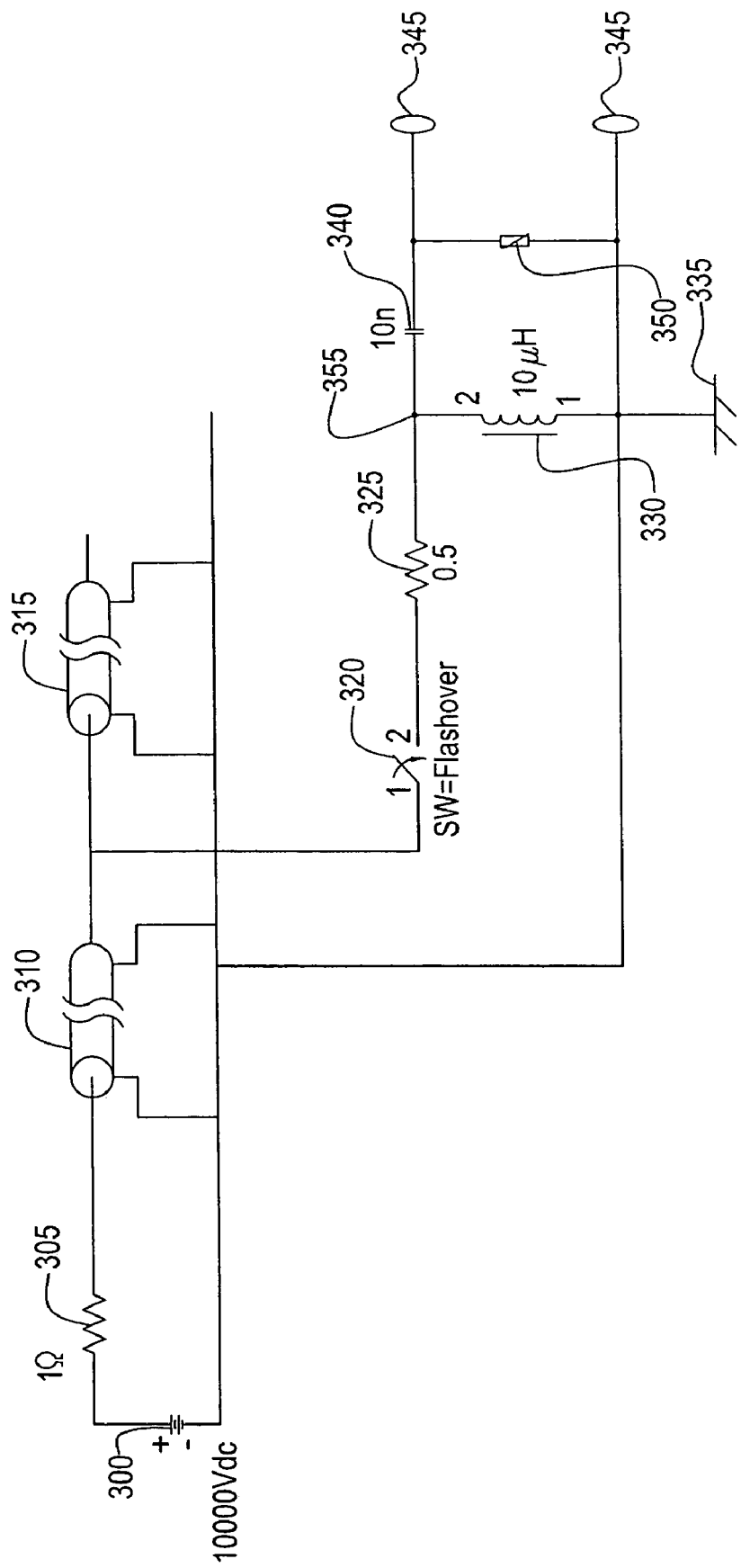
FIG. 3 shows the equivalent circuit for a voltage transient created by flashover.

We can consider an internal flashover of coupler 110, from primary winding 105 to the secondary winding 115, simplified here to one terminal 120 of that winding (see FIG. 1). FIG. 3 shows the equivalent circuit as seen by the flashover voltage transient. A 10 kV dc source 300 represents the instantaneous peak voltage of a 15 kV class distribution transformer having a typical phase to neutral voltage of 7-8 kV rms. Source resistance 305 limits current to a 10 kA short circuit value. Transmission lines 310 and 315 represent a single phase of overhead distribution lines. The closing of switch 320 represents an instantaneous short circuit due to internal flashover. Resistor 325 represents the resistance of a fuse such as 130 and 135, and choke 330 (equivalent to choke 140 of FIG. 1) closes the circuit to pole ground 335. Capacitor 340 high pass couples the communications signals to modem terminals 345, and surge suppressor 350 (equivalent to suppressor 205 in FIG. 2) protects the modem against overvoltage transients. The shunt capacitive loading of capacitor 340 and suppressor 350 (the latter acting as nearly a short circuit during transient events) lowers the initial transient voltage at node 355, and therefore across capacitor 340, allowing use of a lower cost capacitor.

Figure 4:
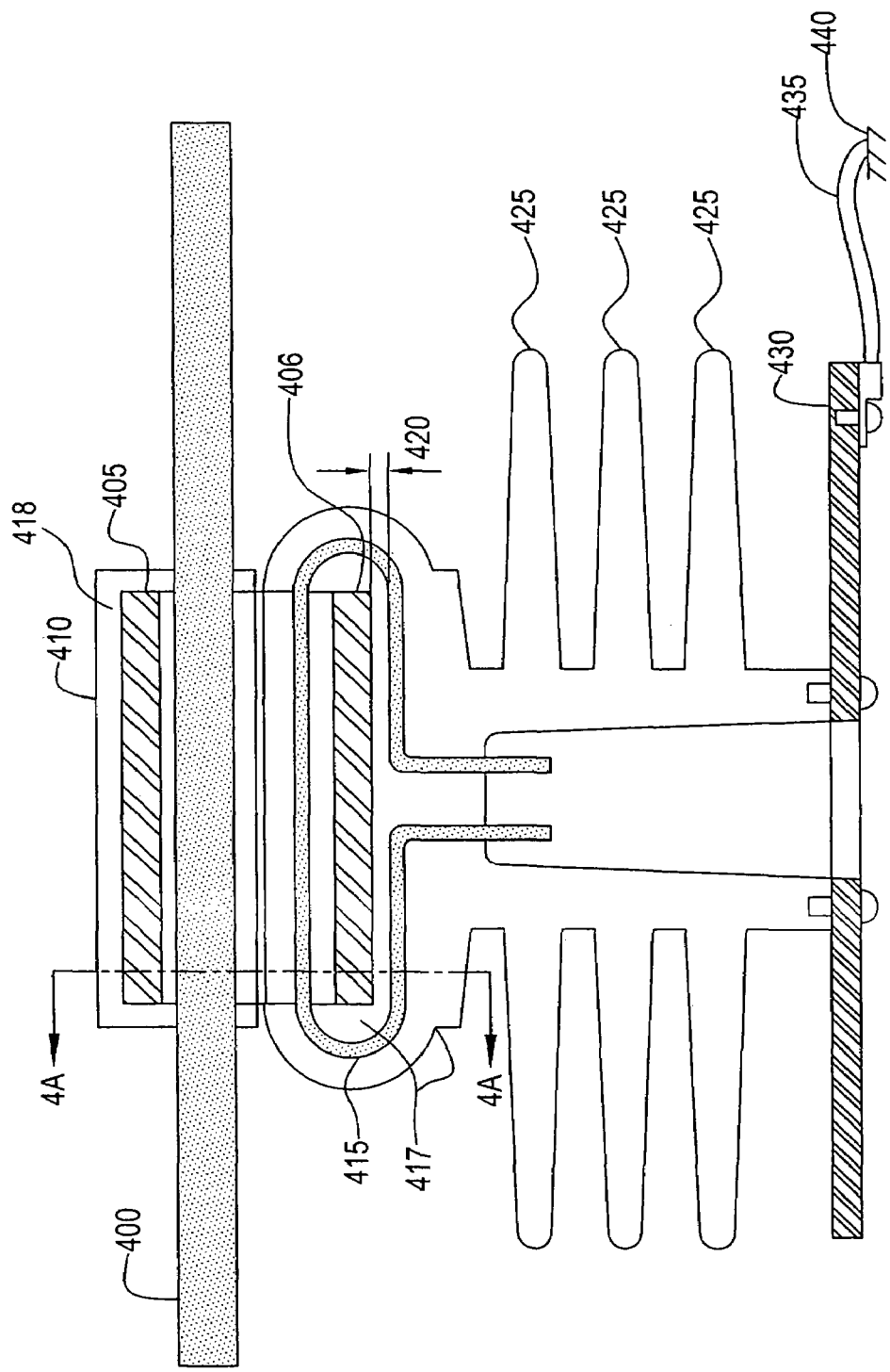
FIG. 4 shows a cross-section of one particular physical implementation of an inductive coupler according to an embodiment of the present invention.
Figure 4A:
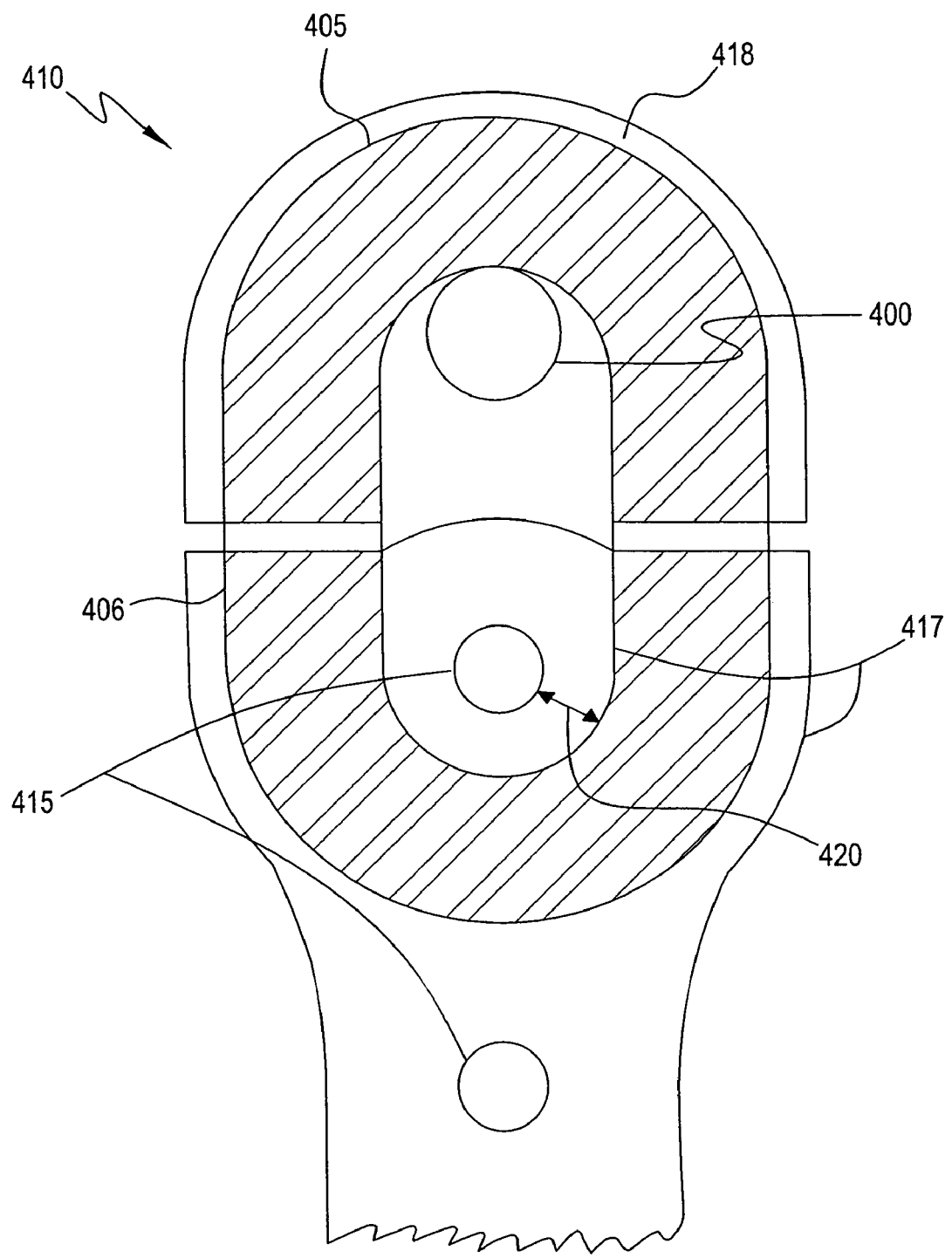
FIG. 4A shows a section 4A-4A of the inductive coupler of FIG. 4.

FIG. 4 illustrates in cross-section one particular physical implementation of an inductive coupler according to an embodiment of the present invention. FIG. 4A shows a section 4A-4A of the inductive coupler of FIG. 4. Coupler 410 includes a magnetic core having an upper portion 405 and a lower portion 406 that form an aperture therebetween. Coupler 410 is situated on a primary power line 400 such that primary power wire 400 passes through the aperture, in the vicinity of upper portion 405. Coupler 410 also includes a secondary wire 415 that passes through the aperture, in the vicinity of lower portion 406. Secondary wire 415 and lower portion 406 are encapsulated in an insulating material 417 so that a layer of insulating material 417 is situated between secondary winding 415 and lower portion 406. The layer of insulating material 417 between secondary winding 415 and lower portion 406 has a thickness 420 appropriate for the line's withstand voltage and BIL voltage. Sheds 425 provide the appropriate leakage path. Conductive plate 430 is attached to the base of the coupler body, and connected via wire 435 to the pole ground 440.

If the coupler body does not provide a sufficient leakage path or insulation commensurate with the steady state or transient voltage on the power line conductor 400, then a flashover could occur. Flashover current external to the coupler 410 would jump to the conductive plate 430, and be routed harmlessly to the pole ground 440.

Figure 5A:
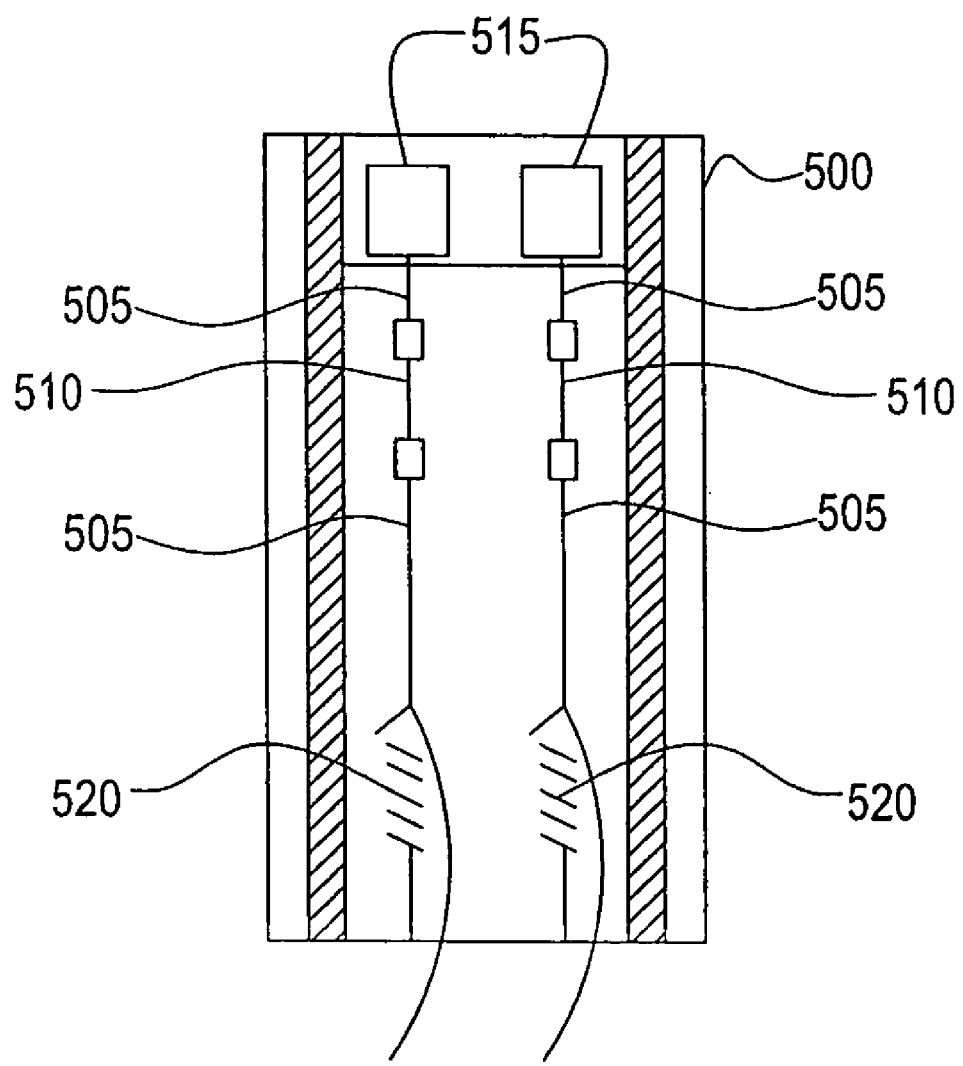
FIGS. 5A and 5B shows particular specific implementations of a dual fuse according to an embodiment of the present invention.

FIG. 5a illustrates a dual fuse 500, as implemented in an expulsion fuse. Wires 505 connect the fuse elements 510 to two-terminal headers 515. The fuse elements 510 are tensed by springs 520, and the entire volume is encased in an arc-quenching material, with ports (not shown) through which any arc gasses are expelled.

Figure 5B:
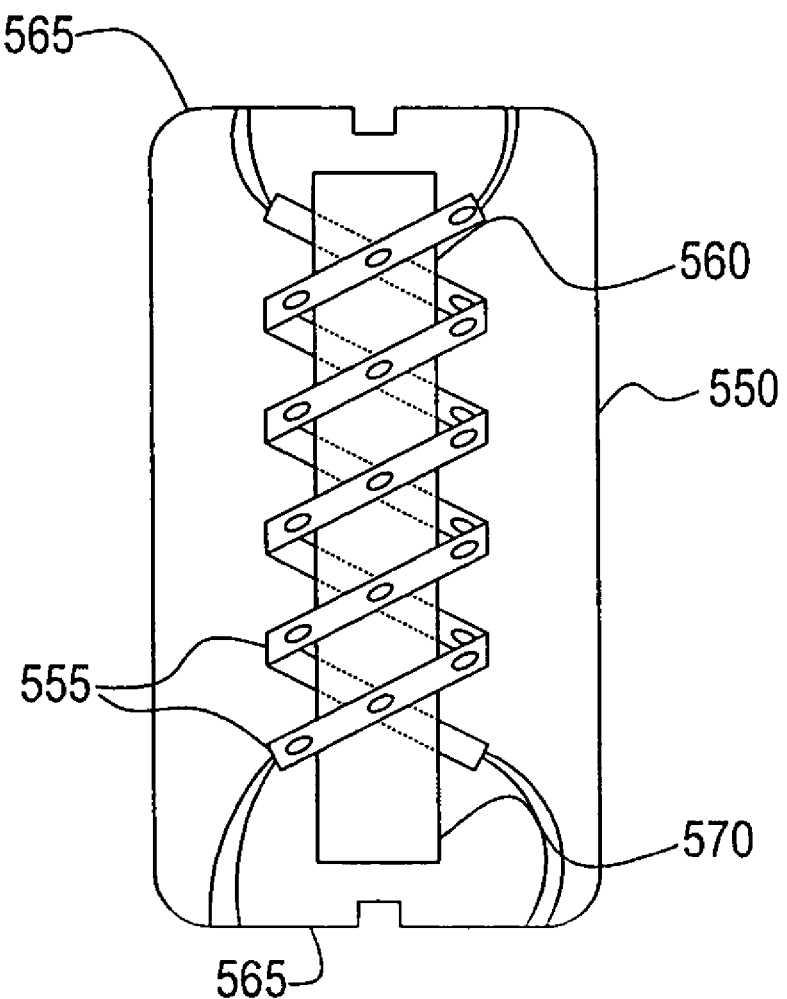

FIG. 5b illustrates a dual fuse 550, as implemented in a current-limiting fuse. Fuse elements 555 are wound on spider form 560 and terminate on two-terminal headers 565. Optionally, the spider may have a hollow core in which magnetic core 570 optionally may be inserted. The entire volume is filled with sand (not shown).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method for protecting loads associated with power distribution system inductive signal couplers, the method comprising:
    providing an inductive signal coupler having a first winding in series with a line conductor of a power distribution system, and a second winding having first and second connection terminals;
    connecting a first terminal of a first fuse to said first connection terminal, and a first terminal of a second fuse to said second connection terminal, a second terminal of each fuse being connected to a communication device;
    connecting a first terminal of a first choke to said second terminal of said first fuse, and a first terminal of a second choke to said second terminal of said second fuse; and
    connecting a second terminal of each choke to an electrical ground,
    wherein said first choke is a wire wound choke capable of conducting a transient current of 10,000 amps, and
    wherein, in a case of a power surge on said second winding, said first fuse and said first choke provide a path to said electrical ground for a surge current.

2. A method according to claim 1, wherein each of said first and second chokes uses wire of sufficient gauge to withstand high current flowing during an actuation time of its associated fuse.

3. A method according to claim 1, wherein each of said first and second chokes possesses a self-resonant frequency in excess of a highest frequency utilized by said communication device.

4. A method according to claim 1, further comprising connecting a first terminal of a surge suppressor to said first connection terminal of said second winding and connecting a second terminal of said surge suppressor to said second connection terminal of said second winding.

5. A method according to claim 4, wherein said surge suppressor is selected from the group consisting of a spark gap and a gas tube surge arrestor.

6. A method according to claim 1, wherein said first fuse and said first choke form a first series resistance, and said second fuse and said second choke form a second series resistance, and wherein said first and second series resistances are each great enough so as to minimize power frequency circulation current.

7. A method according to claim 1, further comprising:
    providing a first resistor in series with said first fuse and said first choke to form a first series resistance, and providing a second resistor in series with said second fuse and said second choke to form a second series resistance, wherein said first and second series resistances are each great enough so as to minimize power circulation current.

8. A method according to claim 1, wherein said first and second fuses are packaged in a single common housing.

9. A method according to claim 8, wherein said first and second fuses are helical current limiting fuses having a helix axis.

10. A method according to claim 9, further comprising: placing a magnetic core is in said helix axis.

11. A method according to claim 1, further comprising: connecting a capacitor in series with said second terminal of each of said first and second fuses and said communication device; and
    connecting a surge suppressor between a communication device side of each capacitor and the electrical ground, so that capacitive loading reduces the magnitude of an initial voltage transient resulting from a flashover between said windings of said inductive signal coupler.

12. A method for protecting loads associated with power distribution system inductive signal couplers, the method comprising:
    providing an inductive signal coupler having a first winding in series with a line conductor of a power distribution system, and a second winding having a first terminal and a second terminal; and
    connecting said first terminal to an electrical ground via a first choke; and
    connecting said second terminal to said electrical ground via a second choke,
    wherein each of said first and second chokes:
        (a) presents a high impedance to signal frequencies and a low impedance to a surge current from an electrical fault signal from a power surge on said second winding.
        (b) is a wire wound choke capable of conducting a transient current of 10,000 amps, and
        (c) provides a path to said electrical ground for said surge current.

13. A method according to claim 12, wherein leads of said second winding are connected to output terminals that are connected to a communication device via series capacitors.

14. A method according to claim 13, further comprising connecting at least one low capacitance surge suppressor across said output terminals.

15. An arrangement of components, comprising:
    an inductive signal coupler having a first winding in series with a line conductor of a power distribution system, and a second winding having a first connection terminal and a second connection terminal;
    a first fuse having a first terminal connected to said first connection terminal, and a second terminal for coupling a signal to a first terminal of a communication device;
    a second fuse having a first terminal connected to said second connection terminal, and a second terminal for coupling a signal to a second terminal of said communication device;
    a first choke having a first terminal connected to said second terminal of said first fuse, and a second terminal connected to an electrical ground; and
    a second choke having a first terminal connected to said second terminal of said second fuse, and a second terminal connected to the electrical ground,
    wherein said first choke is a wire wound choke capable of conducting a transient current of 10,000 amps, and
    wherein, in a case of a power surge on said second winding, said first fuse and said first choke provide a path to said electrical ground for a surge current.

16. The arrangement of claim 15, further comprising a surge suppressor having a first terminal connected to said first connection terminal of said second winding, and a second terminal connected to said second connection terminal of said second winding.

17. The arrangement of claim 16, wherein said surge suppressor is selected from the group consisting of a spark gap and a gas tube surge arrestor.

18. The arrangement of claim 15, further comprising:
a first resistor in series with said first fuse; and
a second resistor in series with said second fuse.

19. The arrangement of claim 15, wherein said first and second fuses are packaged in a single common housing.

20. The arrangement of claim 19, wherein said first and second fuses are helical current limiting fuses.

21. The arrangement of claim 20, wherein said helical current limiting fuses have a magnetic core.

22. The arrangement of claim 15, further comprising:
a first capacitor having a first terminal in series with said second terminal of said first fuse, and a second terminal for said coupling said signal to said first terminal of said communication device;
a second capacitor having a first terminal in series with said second terminal of said second fuse, and a second terminal for said coupling said signal to said second terminal of said communication device;
a surge suppressor between said second terminal of said first capacitor and said second terminal of said second capacitor.

23. An arrangement of components, comprising:
an inductive signal coupler having a first winding in series with a line conductor of a power distribution system, and a second winding having a first connection terminal and a second connection terminal;
a first choke between said first connection terminal and an electrical ground; and
a second choke between said second connection terminal and said electrical ground,
wherein each of said first choke and said second choke presents:
 (a) high impedance to a signal frequency and a low impedance to a surge current from an electrical fault signal from a power surge on said second winding,
 (b) is a wire wound choke capable of conducting a transient current of 10,000 amps, and
 (c) provides a path to said electrical ground for said surge current.

24. The arrangement of claim 23, further comprising:
a first capacitor in series with said first connection terminal and having a device-side terminal for coupling a signal to a first terminal of a communication device; and
a second capacitor in series with said second connection terminal and having a device-side terminal for coupling a signal to a second terminal of said communication device.

25. The arrangement of claim 23, further comprising a surge suppressor for suppressing a fault voltage between said device-side terminal of said first capacitor and said device-side terminal of said second capacitor.

26. The method of claim 1, wherein said first fuse is selected from the group consisting of an expulsion fuse and a current limiting fuse.

27. The arrangement of claim 15, wherein said first fuse is selected from the group consisting of an expulsion fuse and a current limiting fuse.

* * * * *

UNITED STATES PATENT AND TRADEMARK OFFICE
CERTIFICATE OF CORRECTION

| | | |
|---|---|---|
| PATENT NO. | : 7,529,073 B2 | Page 1 of 1 |
| APPLICATION NO. | : 11/500259 | |
| DATED | : May 5, 2009 | |
| INVENTOR(S) | : Cern | |

It is certified that error appears in the above-identified patent and that said Letters Patent is hereby corrected as shown below:

In the specification

In Column 1, Line 27, delete "Broadband" and insert -- Broadband Modems to Power --, therefor.

In the claims

In Column 8, Lines 24-25, in Claim 12, delete "winding." and insert -- winding, --, therefor.

In Column 10, Line 3, in Claim 23, delete "high" and insert -- a high --, therefor.

Signed and Sealed this
Twentieth Day of October, 2015

Michelle K. Lee
*Director of the United States Patent and Trademark Office*